J. A. SINGMASTER AND F. G. BREYER.
MANUFACTURE OF LITHOPONE.
APPLICATION FILED DEC. 4, 1919.
1,411,646.
Patented Apr. 4, 1922.
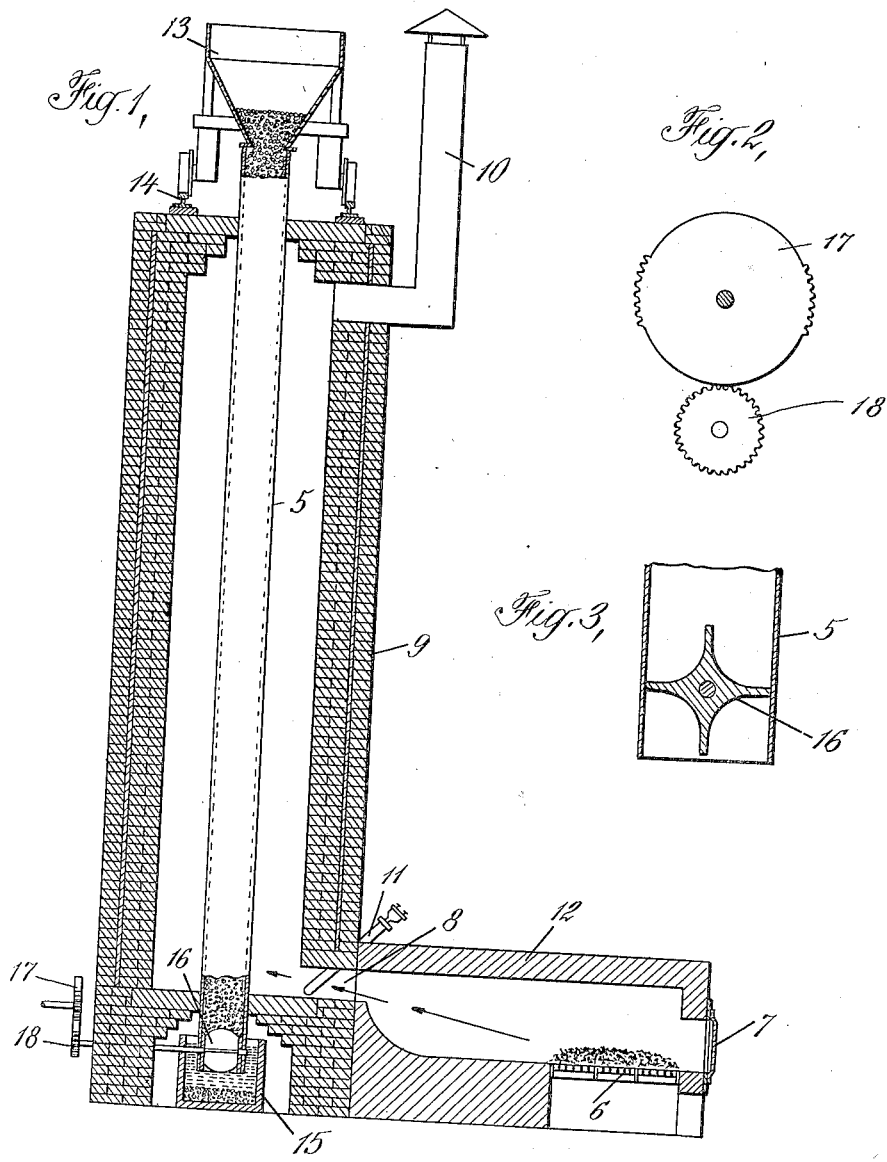
Inventors
James A. Singmaster
Frank G. Breyer
By their Attorneys
Pennie, Davis, Marvin & Edmonds

UNITED STATES PATENT OFFICE.

JAMES A. SINGMASTER AND FRANK G. BREYER, OF PALMERTON, PENNSYLVANIA, ASSIGNORS TO THE NEW JERSEY ZINC COMPANY, OF NEW YORK, N. Y., A CORPORATION OF NEW JERSEY.

MANUFACTURE OF LITHOPONE.

1,411,646.  Specification of Letters Patent.  Patented Apr. 4, 1922.

Application filed December 4, 1919. Serial No. 342,523.

*To all whom it may concern:*

Be it known that we, JAMES A. SINGMASTER and FRANK G. BREYER, residing at Palmerton, county of Carbon, State of Pennsylvania, have invented certain new and useful Improvements in the Manufacture of Lithopone; and we do hereby declare the following to be a full, clear, and exact description of the invention, such as will enable others skilled in the art to which it appertains to make and use the same.

The present invention relates to the manufacture of lithopone and has for its object the provision of an improved method of and apparatus for muffling lithopone.

In the manufacture of lithopone, the precipitate of zinc sulphide and barium sulphate resulting from the interaction of solutions of zinc sulphate and barium sulphide is filter-pressed and, after appropriate drying, is heated or muffled and the hot product plunged directly from the heating chamber into cold water. It has heretofore been customary, in actual practice, to carry out the muffling of the raw or crude lithopone in horizontal muffles, and to this end a layer of crude lithopone is charged on to the bottom of the muffle and heated, usually to a dull red heat. In the usual muffling operation, that portion of the lithopone lying on the highly heated bottom of the muffle is liable to be overheated, while other portions of the charge may not be sufficiently heated. An attempt is made to avoid the effect of this non-uniformity of heating by stirring the material from time to time. This is only a partial remedy, entails the use of skilled labor, and increases the difficulty of maintaining the proper atmosphere in the muffle.

The necessity of a proper atmosphere protecting the lithopone from oxidizing influences during the muffling operation has heretofore been recognized and, in certain cases, it has been customary to introduce a neutral or reducing gas, such, for example, as steam or producer gas, into the muffle, so as to maintain a neutral or reducing atmosphere above the charge and prevent the ingress of air.

As heretofore generally practiced, the muffling of lithopone has been an intermittent operation. The crude lithopone is charged into the muffle through a charging door, and after the completion of the muffling the hot product is manually withdrawn from the muffle into a body of cold water, and thereupon a new charge is put into the muffle. During the charging and discharging operations, the temperature of the muffle necessarily falls, and some time is required to bring a fresh charge to the desired muffling temperature. Moreover, this intermittent operation is wasteful of heat. In addition, the amount of lithopone which can be effectively treated at one operation is smaller than the cubical capacity of the muffle; or, in other words, the depth of the charge in the muffle is kept relatively small compared with the vertical height of the muffle in an attempt to cut down as much as possible overheating or underheating of portions of the material. This means a relatively large space in the muffle above the charge, with the attendant difficulties of maintaining non-oxidizing gases therein and excluding the air therefrom.

In the copending application of Breyer, Croll and Farber, Serial No. 327,921, the existence of critical muffling temperatures for lithopones of given properties is, as far as we are aware, recognized for the first time. The vital importance of controlled and uniform heating for the production of such superior lithopones is set forth in the application in question, and the present invention contemplates the muffling of lithopone in a uniform and controlled manner and, at the same time, provides for practically continuous and automatic operation. Thus, in its principal aspect, the present invention involves feeding the lithopone, preferably automatically, as, for example, by gravity, to a properly proportioned, vertically disposed and externally heated retort. We have found that in a vertical muffle, through which the material passes by gravity with consequently little or no agitation, there is a relationship between the cross-section and length of the muffle employed which cannot be exceeded without producing non-uniform material. We believe that the carrying of the heat in such a muffle to the center of the column is largely due to its being transferred by the rising gases present, in addition to direct conduction. When the cross-section is unduly increased, we believe that channeling of the gases takes place with consequent non-uniformity of the product. We do not wish to restrict ourselves to this theory, although it seems the plausible explanation for the phenomena we have observed. We do know, however, that the limits of this relationship between cross-section and length are quite close, and have, for example, found in actual practice that an iron tube twenty-five feet long and ten inches in diameter gives a uniform product, whereas a tube of the same length and twelve inches in diameter gives a quite perceptibly non-uniform product.

In the preferred practice of the invention we use a vertical muffle made of iron or other good heat conducting material, ten inches in diameter and twenty-five feet in length, in which the lithopone is heated to the desired temperature and for the necessary period of time. This muffle is continuously operated, and is open to the atmosphere at its upper end and projects into a body of cold water at its lower or discharge end. While the charging and discharging operations may be either continuous or intermittent in character, the muffling operation as a whole is continuous.

Within the retort the lithopone is in effect subjected to a two-stage treatment, the first stage being a preheating treatment and the second stage the muffling operation proper. In the preheating stage, the lithopone is subjected, at a temperature below the reacting or critical muffling temperature, to the scavenging action of the gases escaping from the active muffling zone, and the incoming lithopone is thereby dried and freed from entrained air. In the second stage or muffling operation proper the preheated lithopone is subjected to a sufficiently high temperature for the necessary period of time to impart to it the desired properties.

In the accompanying drawings,

Fig. 1 is a diagrammatic elevation of a retort furnace adapted for the practice of the invention; and Figs. 2 and 3 are detail views of the star-wheel discharging device at the lower end of the retort.

Referring now to the drawings, the retort or muffler 5 may conveniently be made of a cylindrical pipe of wrought iron. The diameter and length of the pipe should be appropriately proportioned to insure uniform heating of the lithopone for the necessary period of time. We have secured excellent results with a wrought iron pipe 10 inches in diameter and from 25 to 30 feet in length.

The retort 5 is externally heated by the hot gases resulting from the burning fuel, such as coal, on the grate 6. The grate is embodied in a suitable furnace structure 12 of fire-brick, having a fuel charging door 7 and a flue 8 for conducting the hot products of combustion into contact with the retort 5. The retort is mounted within a fire-brick structure 9 so that the hot products of combustion pass upwardly around the retort and out an exit flue 10.

A pyrometer 11 is preferably positioned in the flue 8 for indicating the temperature of the hot gases entering the chamber formed by the structure 9. The furnace structure 12 is designed so as to insure a relatively high heat storage capacity in the passages traversed by the hot products of combustion, whereby these products of combustion, as they emerge from the flue 8, are more conveniently controlled and maintained at a practically uniform temperature. The pyrometer 11 indicates to the operator any departure from the desired uniform temperature of the hot gases emerging from the flue 8, and permits him to promptly modify the firing conditions to secure the desired uniform temperature.

The top of the retort is open to permit the escape of gases. In the drawings, we have represented a car or hopper 13 mounted on rails 14 and positioned directly above the open top of the retort 5 for continuously feeding lithopone into the retort. The car or hopper 13 is filled with lithopone, and when emptied is replaced by a full car without interrupting the continuity of the muffling operation.

The lower end of the retort projects into a body of cold water in a suitable receptacle 15. If desired, water may be continuously supplied to and withdrawn from the receptacle 15 in order to maintain the body of water therein at the desired temperature to effect the sudden cooling of the lithopone discharged from the retort. In the drawings, we have indicated a star-wheel discharge operatively mounted at the lower end of the retort 5. This star-wheel discharge comprises a rotatably mounted star-wheel 16 having four blades or wings. The shaft of the star-wheel projects through the base of the furnace structure 12 and is given a quarter turn at predetermined intervals. Each time the star-wheel is turned through a quarter revolution a definite amount of lithopone is discharged from the retort into the body of water in the receptacle 15. In the drawings we have illustrated a gear train 17—18, in which an appropriate number of teeth on one member 17 thereof is omitted so as to obtain the desired periodic turning of the star-wheel. It will of course be understood that various other devices may be employed for actuating the star-wheel. Moreover, other instrumentalities and means may be employed for effecting the continuous or periodic discharge of an appropriate amount of lithopone from the lower end of the retort 5.

In the normal operation of the apparatus illustrated in the drawings the retort 5 is filled with the lithopone. The crude lithopone, as it is charged into the top of the retort, is generally in the form of small lumps, and the spaces betwen these lumps or particles of lithopone, during the muffling operation, are filled with the gases evolved from the lithopone at the muffling temperature, so that the lithopone within the retort during the entire muffling operation, is surrounded by a non-oxidizing atmosphere composed, for the most part, of hot water vapor. The gases driven off from the lithopone during the muffling operation escape through the open top of the retort. The amount of these gases and the design of the retort are such that there is maintained within the retort, and more especially in the active muffling zone thereof, a gaseous pressure slightly greater than atmospheric pressure, whereby the entrance of air into the retort is effectually and positively prevented.

In the upper part of the retort the incoming lithopone is subjected to the hot gases escaping from the active muffling zone of the retort. These hot gases serve to dry and preheat the lithopone, and more particularly they serve to drive off from the incoming lithopone any occluded or entrained air, so that when the lithopone reaches the active muffling zone practically all of the air entrained in the original raw lithopone has been eliminated. This insures the muffling of the lithopone under the desired non-oxidizing conditions. As the result of this preheating stage in our muffling operation, we are able to feed into the retort a lithopone containing more moisture than has heretofore been good practice in the usual lithopone muffles. For this reason, when muffling in accordance with our present invention, the lithopone need not be dried as thoroughly as has heretofore been necessary. After filter-pressing, the crude lithopone ordinarily contains about 50% of moisture. It has heretofore been customary to dry the lithopone until its moisture content was reduced to about 1 or 2%. When muffling in accordance with our present invention, it is entirely feasible to dry the crude lithopone until its moisture content is about 10%, thereby materially reducing the cost of drying.

During the muffling operation, the lithopone is maintained in the active muffling zone of the retort at an appropriate muffling temperature for the necessary period of time to secure the desired degree of strength, color and brightness. We have found that excellent results may be obtained when the rate of discharging and charging of the retort is so proportioned that a period of from about 5 to 10 hours is required for the lithopone to travel from the top of the retort to the bottom thereof, during which period the lithopone is subjected to a temperature of from about 550° to 800° C., depending upon the nature of the crude material and the properties desired in the finished product.

The muffled lithopone, as will be understood by those skilled in the art, is removed from the water in the receptacle 15 and subjected to further treatment, such as washing, grinding and drying, substantially in accordance with the present practice.

We have found that lithopone, muffled in accordance with the invention, possesses marked superior properties over lithopone heated in ordinary muffles in accordance with the heretofore customary practice. In particular, we have found that lithopone calcined in accordance with the invention is remarkably resistant to deterioration from sunlight. In other words, the muffling operation of the invention results in the production of a superior product having improved light-resisting properties.

From the foregoing description it will be noted that the muffling of the lithopone, in accordance with the invention, is carried out in a substantially continuous manner. Moreover, by the method of the invention, the lithopone is in effect subjected to a two-stage muffling treatment, whereby the incoming lithopone is subjected to a drying and preheating treatment preparatory to the muffling treatment proper. Furthermore, the drying and preheating treatment is carried out at the expense of the hot gases driven off from the lithopone during the active muffling treatment, thereby effecting a marked economy in the heat required for drying of the crude lithopone, as well as in the heat necessary for the active muffling treatment.

The apparatus illustrated in the accompanying drawings diagrammatically represents our preferred construction, but it will, of course, be understood that the apparatus is susceptible of many modifications within the spirit and scope of the invention. In principle, the apparatus of the invention comprises a continuously operated vertical retort or muffle open at the top for the escape of gases and sealed, when desired, at the bottom to prevent the entrance of air into the retort. Various expedients may be employed for sealing the bottom of the retort, and likewise the desired opening at the top of the retort may take different forms. With respect to the opening at the top of the retort, it is only necessary to provide an escape for the gases resulting from the muffling operation at such a rate that within the active muffling zone of the retort there is maintained a gaseous pressure slightly in excess of the atmospheric pressure.

The construction of the retort 5 of metal, such as wrought iron, is of especial advantage in the muffling of lithopone, since the high heat conductivity of the metal enables an economical use of the available heat and insures more uniform muffling conditions within the retort. If desired, the retort may be of a slightly tapered cross-sectional area, from above downwardly, throughout a part or the whole of its length, whereby the increase in the cross-sectional area of the retort from the top towards the bottom facilitates the progressive passage of the lithopone therethrough.

The lithopone, in accordance with the improved method of the invention, is progressively passed through the vertically disposed retort, so that the muffling operation in its entirety is a substantially continuous operation. The aforementioned relationship between the diameter and length of the retort is an important feature of the invention. In general, this relationship between the diameter and length of the retort must be such as to insure uniform muffling of the lithopone. By uniform muffling we mean that substantially no part of the lithopone is overheated and that substantially all of the lithopone is ultimately raised to the desired critical muffling temperature. For practical reasons, we prefer to employ a retort of about twenty-five to thirty feet in effective length, and with such a length of retort we find that the diameter of the retort should not exceed about ten inches for the most satisfactory results. Thus, we have secured excellent results with a ten-inch wrought iron retort whose length within the effective heating chamber was 25 feet; the retort having an over-all length of 30½ feet, 3 feet projecting above the heating chamber and 2½ feet extending below the heating chamber. However, while these are the dimensions which we now prefer to employ in practice, we wish it to be understood that the principle of the invention is not limited to a retort of these particular dimensions, since broadly the invention contemplates such a relationship between the diameter and effective length of the vertically disposed retort that substantially every particle of the lithopone is ultimately subjected to the desired critical muffling temperature, without overheating, during the progressive passage of the lithopone therethrough.

We claim:

1. The improvement in the manufacture of lithopone, which comprises progressively passing the lithopone through an externally heated and vertically disposed retort of good heat conducting material and of such proportions as to secure uniform heating of the lithopone in its passage through the retort; substantially as described.

2. The improvement in the manufacture of lithopone, which comprises progressively passing the lithopone through an externally heated and vertically disposed cylindrical retort of good heat conducting material of approximately ten inches in diameter and of from about twenty-five to about thirty feet in length so as to secure uniform heating of the lithopone in its passage through the retort; substantially as described.

3. The improvement in the manufacture of lithopone, which comprises progressively passing the lithopone through an externally heated and vertically disposed cylindrical iron retort of less than about twelve inches in diameter and of from about twenty-five to about thirty feet in length; substantially as described.

4. The improvement in the manufacture of lithopone, which comprises progressively passing the lithopone by gravity through an externally heated chamber in which a non-oxidizing atmosphere of slightly greater pressure than atmospheric pressure is maintained by the gases driven off from the lithopone as a result of the muffling operation, sealing the chamber at the bottom against the entrance of air, and permitting the escape of gases at the top of the chamber; substantially as described.

5. The improvement in the manufacture of lithopone, which comprises muffling lithopone in a progressively operated vertical retort in a non-oxidizing gaseous atmosphere at a pressure slightly greater than atmospheric pressure, sealing the lower end of the retort against the entrance of air, and permitting the escape of gases at the top of the retort at such a rate as to maintain within the retort a pressure slightly greater than atmospheric pressure and thereby preventing the entrance of air into the retort; substantially as described.

6. The improvement in the manufacture of lithopone, which comprises subjecting the lithopone in a progressively operated vertical retort to a temperature of from about 550° to about 800° C. in an atmosphere composed exclusively of the gases driven off from the lithopone as a result of the muffling treatment; substantially as described.

7. The improvement in the manufacture of lithopone, which comprises passing the lithopone by gravity through an externally heated chamber in which a non-oxidizing atmosphere of slightly greater pressure than atmospheric pressure is maintained by the gases driven off from the lithopone as a result of the muffling treatment, progressively discharging the muffled product from the bottom of the chamber into a body of cold water, sealing the bottom of the chamber against the entrance of air, and permitting the escape of gases at the top of the chamber; substantially as described.

8. The improvement in the manufacture of lithopone, which comprises progressively muffling the lithopone in two-stage operation, in the first stage of which the lithopone is subjected to a drying and preheating treatment and in the second stage of which the lithopone is subjected to a muffling temperature of from about 550° to about 800° C.; substantially as described.

9. The improvement in the manufacture of lithopone, which comprises progressively passing the lithopone by gravity through a heated upright metallic retort of such proportions as to secure uniform heating of the lithopone in its passage through the retort; substantially as described.

10. The improvement in the manufacture of lithopone, which comprises progressively passing the lithopone through a heated upright tubular retort, the cross sectional area and length of said retort being so proportioned and the heating thereof being so regulated that substantially all of the lithopone is ultimately raised to the desired muffling temperature and no part thereof is overheated; substantially as described.

11. The improvement in the manufacture of lithopone, which comprises progressively passing the lithopone through a heated upright retort having a diameter not exceeding about twelve inches and a length of at least twenty-five feet and thereby uniformly heating the lithopone in its passage through the retort.

12. The improvement in the manufacture of lithopone, which comprises progressively passing the lithopone through a heated upright retort having a diameter not exceeding about twelve inches and a length of at least twenty-five feet and so regulating the heating of the retort that substantially all of the lithopone is ultimately raised to the desired muffling temperature and no part thereof is overheated in its passage through the retort.

In testimony whereof we affix our signatures.

JAMES A. SINGMASTER.
FRANK G. BREYER.